United States Patent
Roy et al.

(10) Patent No.: US 11,639,584 B2
(45) Date of Patent: May 2, 2023

(54) COMPOSITE RAIL JOINT END POST

(71) Applicant: L.B. FOSTER COMPANY, Pittsburgh, PA (US)

(72) Inventors: Arka Prabha Roy, Pittsburgh, PA (US); Korhan Ciloglu, Pittsburgh, PA (US); Sidney Shue, Canonsburg, PA (US)

(73) Assignee: L B Foster Company, Pittsburgh, PA (US)

( * ) Notice: Subject to any disclaimer, the term of this patent is extended or adjusted under 35 U.S.C. 154(b) by 299 days.

(21) Appl. No.: 16/134,749

(22) Filed: Sep. 18, 2018

(65) Prior Publication Data

US 2019/0085513 A1     Mar. 21, 2019

Related U.S. Application Data

(60) Provisional application No. 62/560,011, filed on Sep. 18, 2017.

(51) Int. Cl.
     *E01B 11/54*      (2006.01)
     *B60M 5/00*      (2006.01)

(52) U.S. Cl.
     CPC ............... *E01B 11/54* (2013.01); *B60M 5/00* (2013.01)

(58) Field of Classification Search
     CPC ............ E01B 11/00; E01B 11/54; B60M 5/00
     See application file for complete search history.

(56) References Cited

U.S. PATENT DOCUMENTS

| | | | | |
|---|---|---|---|---|
| 1,474,459 | A * | 11/1923 | Wolhaupter | E01B 11/54 238/159 |
| 8,070,073 | B2 * | 12/2011 | Ciloglu | E01B 11/54 238/152 |
| 2005/0098646 | A1 * | 5/2005 | Urmson, Jr. | E01B 11/04 238/151 |

(Continued)

FOREIGN PATENT DOCUMENTS

| | | |
|---|---|---|
| CN | 200 996 118 | 12/2000 |
| FR | 1 365 416 | 7/1964 |

OTHER PUBLICATIONS

Form PCT/ISA/220, PCT Notification of Transmittal of the International Search Report and the Written Opinion of the International Searching Authority, or the Declaration, PCT/US2018/051580, dated Dec. 14, 2018.

(Continued)

*Primary Examiner* — Robert J McCarry, Jr.
(74) *Attorney, Agent, or Firm* — Paul D Bangor, Jr, Esquire; Clark Hill, PLC

(57) ABSTRACT

An end post (30) for a rail joint assembly comprising: a top portion (12) consisting essentially of a first electrically insulating material comprising a fiber reinforced polymer material and having a profile substantially identical to cross-sectional shapes of rail head sections of first and second rails of the rail joint assembly; a base (16) having a profile substantially identical to cross-sectional shapes of rail base sections of first and second rails of the rail joint assembly; and a stem (14) disposed between the top portion (12) and the base (16); wherein the stem (14) and the base (16) consist essentially of a second electrically insulating material comprising a polymer material.

14 Claims, 1 Drawing Sheet

(56) References Cited

U.S. PATENT DOCUMENTS

| | | | |
|---|---|---|---|
| 2007/0272762 A1* | 11/2007 | Click ...................... | E01B 11/54 |
| | | | 238/14.05 |
| 2010/0213269 A1* | 8/2010 | Cioglu .................. | E01B 11/54 |
| | | | 238/153 |
| 2019/0085513 A1* | 3/2019 | Roy ........................ | E01B 11/54 |

OTHER PUBLICATIONS

Form PCT/ISA/210, PCT International Search Report for International Application No. PCT/US2018/051580, dated Dec. 14, 2018.
Form PCT/ISA/237, PCT Written Opinion of the International Searching Authority for International Application No. PCT/US2018/051580, dated Dec. 14, 2018.

* cited by examiner

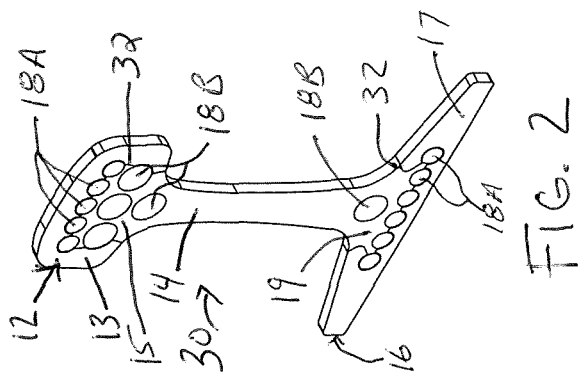
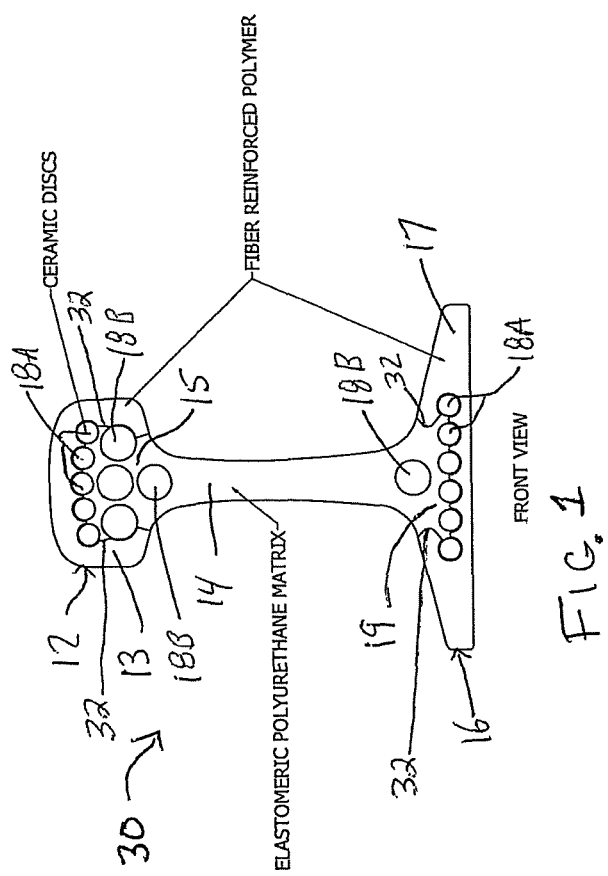

COMPOSITE RAIL JOINT END POST

RELATED APPLICATIONS

This application claims the benefit of provisional patent application U.S. Ser. No. 62/560,011 filed Sep. 18, 2017, which is incorporated by reference herein for all purposes.

TECHNICAL FIELD

This disclosure relates to an end post construction for use in an insulated rail joint assembly typically used in a railway or railroad track system.

BACKGROUND-FIELD OF THE DISCLOSURE

A rail joint assembly connects adjacent rail sections together by mechanically splicing the rail ends. Prior art joint assemblies typically involve joint bars placed along the rails across the joint, on either side of the webs and secured by glue and/or bolts. A separator such as an end post, a gasket or other spacer may be placed between the rail ends. Reinforcing fiberglass cloth may be placed into the bond line between the rail ends and between the joint bar and rail to strengthen and insulate the joint.

End posts are used in insulated rail joints between the two rails for electrical insulation. The electrical insulation in a structurally continuous joint is needed to control railroad signals and resist traction power return currents in transit railroads. There two common types of materials used in end post design: (1) fiber reinforced composite (e.g. G10FR4) and (2) molded polymer with high elongation properties (nylon, polyurethane etc.).

End posts made of elastomeric materials are commonly used in the middle of a joint where two rails come together. In the conventional insulated joint (IJ) design the end post is not designed to carry structural loading and it only serves as a spacer. This is mainly due to not having access to an insulating material that is structurally capable of handling complex loading in track. Rail heads tend to flow under repeated loading due to the discontinuity along the rail in a joint. Discontinuity in the rail amplifies impact loads and bending stresses which in turn shorten the life of a joint but also create a maintenance headache for the railroads, because it creates the necessity of periodical inspection and grinding of rail head area.

If one can use an insulating material in the end post that is like steel in terms of its mechanical behavior the rail flow may be prevented and maintenance needed on the end post can be reduced. Finite element analysis results showed that supporting the rail head in the vertical plane reduces stresses in the adhesive layer and joint bars significantly under bending. The reduction in stresses can also be measured in laboratory environment. Ceramics can be good candidates for replacing steel in applications involving high loads demanding high electrical insulation, but they are brittle and their brittleness should be accounted for in the design process. End posts with solid ceramic rail head sections didn't yield successful results in a railroad track. In-track tests indicated a composite end post with a solid ceramic top can disintegrate in a matter of weeks in track under crushing rail head forces and impacts.

Ceramics do not exhibit ductility and therefore when they fail the progression of failure is completely uncontrolled. In other words, when a ceramic part fails the fracture causing the failure may be arrested in a very short distance making the failure appear in the form of "chipping" of small particles or the same fracture may easily run across the full section of a part causing an immediate and complete failure.

Some applications require electrical insulation through the rail joint, such as for signaling, broken rail detection, track movement or train location purposes. In those applications, insulating materials are used as separators between the rail ends, and may be also used to separate the joint bars from the rails.

One typical rail joint assembly is described in U.S. Pat. No. 3,100,080 to Fiechter which discloses a fishplate bonded to either side of a rail web, with a through-bolt securing the entire arrangement. The rail is supported on a tie, with a tie plate between the tie and the base of the rail. U.S. Pat. No. 3,381,892 to Eisses discloses another typical insulating rail joint assembly configuration, having a fishplate on either side of a rail web, with an insulating paste between the web and each fishplate. In addition, U.S. Pat. No. 4,773,590 to Dash et al., teaches the use of polyurethane or fiberglass end posts as part of an insulated rail joint assembly. Further, U.S. Pat. No. 3,727,838 to Bergh teaches an electrically insulating rail joint end post having steel face plates and at least one high compressive strength thin insulating ceramic spacer sheet adhesively bonded on each face to steel face plates or steel filler plates and where at least the edges of the end post are peripherally protected by a nonconducting polymeric coating, conveniently by coating of the entire end post.

The prior art arrangements give rise to certain difficulties particularly where end posts made of polymeric or elastomeric materials are used in the middle of an insulated rail joint. In such a conventional insulated rail joint, the end post is not designed to carry structural loading and generally only serves as an insulating spacer. This is mainly due to the lack of insulating materials that are structurally capable of handling complex loading in the railroad track. Rail heads tend to flow under repeated loading due to the discontinuity along the rail in a joint. Discontinuity in the rail amplifies impact loads and bending stresses which in turn shorten the life of insulated rail joints. Additionally, such discontinuity also creates maintenance headaches for the railroads, because it requires periodic inspection and grinding of the rail head area.

Accordingly, it would be desirable to provide an insulating rail joint assembly employing an end post exhibiting mechanical behavior similar to steel to prevent rail head flow and thereby increase the life of the rail joint while reducing maintenance requirements for the rail joint.

These and other advantages of the disclosure will be appreciated by reference to the detailed description of the preferred embodiment(s) that follow.

BRIEF SUMMARY OF THE DISCLOSURE

In a preferred aspect, the present disclosure comprises an end post (30) for a rail joint assembly comprising: a top portion (12) consisting essentially of a first electrically insulating material comprising a fiber reinforced polymer material and having a profile substantially identical to cross-sectional shapes of rail head sections of first and second rails of the rail joint assembly; a base (16) having a profile substantially identical to cross-sectional shapes of rail base sections of first and second rails of the rail joint assembly; and a stem (14) disposed between the top portion (12) and the base (16); wherein the stem (14) and the base (16) consist essentially of a second electrically insulating material comprising a polymer material.

In another preferred aspect, the present disclosure comprises an end post (30) for a rail joint assembly comprising:

a top portion (12) consisting essentially of a first electrically insulating material comprising a fiber reinforced polymer material and having a profile substantially identical to cross-sectional shapes of rail head sections of first and second rails of the rail joint assembly; a base (16) consisting essentially of the first electrically insulating material comprising a fiber reinforced polymer material having a profile substantially identical to cross-sectional shapes of rail base sections of first and second rails of the rail joint assembly; and a stem (14) disposed between the top portion (12) and the base (16); wherein the stem (14) consists essentially of a second electrically insulating material comprising a polymer material.

In yet another preferred aspect, the present disclosure comprises an end post (30) for a rail joint assembly comprising: a top portion (12) having a profile substantially identical to cross-sectional shapes of rail head sections of first and second rails of the rail joint assembly; wherein the top portion (12) comprises a top portion inner area (15) and a top portion outer area (13) along a perimeter of the top portion (12); a base (16) having a profile substantially identical to cross-sectional shapes of rail base sections of first and second rails of the rail joint assembly; wherein the base comprises a base inner area (19) and a base outer area (17) along a perimeter of the base (16); and a stem (14) disposed between the top portion (12) and the base (16); wherein the top portion outer area (13) and the base outer area (17) consist essentially of a first electrically insulating material comprising a fiber reinforced polymer material; and wherein the top portion inner area (15), stem (14) and base inner area (19) consist essentially of a second electrically insulating material comprising a polymer material.

In another aspect of the end post of the present disclosure, the first electrically insulating material comprises one of G10FR4 or other fiberglass-epoxy laminate material made of glass cloth impregnated with an epoxy resin; and the second electrically insulating material comprises polyurethane.

In yet another aspect of the end post of the present disclosure, one or more of the top portion (12), base (16) and stem (14) comprise a plurality of pieces (18A, 18B) of a third electrically insulating material comprising a ceramic material.

In another aspect of the end post of the present disclosure, the pieces (18A, 18B) of the third electrically insulating material are substantially disc-shaped or substantially cylindrical-shaped.

In a further aspect of the end post of the present disclosure, the pieces (18A, 18B) of the third electrically insulating material are of equal or different sizes.

In another aspect of the end post of the present disclosure, the pieces (18A, 18B) of the third electrically insulating material are disposed on or in the first electrically insulating material and/or the second electrically insulating material.

In yet another aspect of the end post of the present disclosure, the pieces (18A, 18B) of the third electrically insulating material comprise or consist essentially of zirconium dioxide, aluminum oxide or silicon nitride.

In another aspect of the end post of the present disclosure, the pieces (18A, 18B) of the third electrically insulating material consist of pieces of two sizes: a first small size (18A) and a second larger size (18B).

In a further aspect of the end post of the present disclosure, a plurality of the pieces (18A, 18B) of the third electrically insulating material are spaced apart and attached to, by adhesive or other means, an inner side of the top portion outer area (13) and/or the base outer area (17).

In another aspect of the end post of the present disclosure, a plurality of the first small size pieces (18A) of the third electrically insulating material are spaced apart and attached to, by adhesive or other means, an inner side of the top portion outer area (13) and/or an inner side of the base outer area (17).

In yet another aspect, an end post of the present disclosure further comprises one or more interference fits (32) wherein each of the interference fits (32) may comprise one or more complementary shapes including geometric shapes.

In a further aspect of the end post of the present disclosure, the interference fits (32) are used for one or more of the following: to assist in locking together the stem (14) with the top portion (12); to assist in locking together the stem (14) with the base (16); to assist in locking together the top portion inner area (15) with the top portion outer area (13); and to assist in locking together the base inner area (19) with the base outer area (17).

In another preferred aspect, the present disclosure comprises an end post (30) for a rail joint assembly comprising: a top portion (12) having a profile substantially identical to cross-sectional shapes of rail head sections of first and second rails of the rail joint assembly; wherein the top portion (12) comprises a top portion inner area (15) and a top portion outer area (13) along a perimeter of the top portion; a base (16) having a profile substantially identical to cross-sectional shapes of rail base sections of first and second rails of the rail joint assembly; wherein the base (16) comprises a base inner area (19) and a base outer area (17) along a perimeter of the base; a stem (14) disposed between the top portion (12) and the base (16); wherein the top portion outer area (13) and the base outer area (17) consist essentially of a first electrically insulating material comprising a fiber reinforced polymer material; wherein the top portion inner area (15), stem (14) and base inner area (19) consist essentially of a second electrically insulating material comprising a polymer material; a plurality of first pieces (18A, 18B) of a third electrically insulating material comprising a ceramic material spaced apart and attached to, by adhesive or other means, an inner side of the top portion outer area (13) and to an inner side of the base outer area (17), wherein each of the plurality of first pieces (18A, 18B) is also disposed, in-part, within the second electrically insulating material in either the top portion inner area (15) or the base inner area (19); and a plurality of second pieces (18B) of the third electrically insulating material, wherein each of the plurality of second pieces (18B) is disposed, in-whole or in-part, within the second electrically insulating material in either the top portion inner area (15) or the base inner area (19).

In yet another preferred aspect, the present disclosure comprises a method for making an end post (30) for a rail joint assembly wherein the end post (30) comprises a top portion (12) and having a profile substantially identical to cross-sectional shapes of rail head sections of first and second rails of the rail joint assembly; wherein the top portion (12) comprises a top portion inner area (15) consisting essentially of a second electrically insulating material comprising a polymer material and a top portion outer area (13) consisting essentially of a first electrically insulating material comprising a fiber reinforced polymer material along a perimeter of the top portion (12); a base (16) having a profile substantially identical to cross-sectional shapes of rail base sections of first and second rails of the rail joint assembly; wherein the base (16) comprises a base inner area (19) consisting essentially of the second electrically insulating material and a base outer area (17) consisting essentially of the first electrically insulating material along a perimeter of the base (16); and a stem (14) consisting essentially of the second electrically insulating material disposed between the top portion (12) and the base (16), comprising: attaching, by adhesive or other means, a plurality of first pieces (18A, 18B) of a third electrically insulating material comprising a ceramic material spaced apart and along an inner side of a top portion outer area (13) and spaced apart and along an inner side of a base outer area (17), placing the top portion outer area (13) with attached first pieces (18A) and the base outer area (17) with attached first pieces (18A) spaced apart in a mold, wherein the mold defines one or more cavities for forming the top portion inner area (15), stem (14) and base inner area (19); placing a plurality of second pieces (18B) of the third electrically insulating material in the mold, wherein each of the plurality of second pieces (18B) is disposed, in-whole or in-part, within a mold cavity for forming either the top portion inner area (15) or the base inner area (19); and casting the second electrically insulating material comprising a polymer material within the one or more mold cavities to form the top portion inner area (15), stem (14) and base inner area (19) of the end post (30).

BRIEF DESCRIPTION OF THE SEVERAL VIEWS OF THE DRAWINGS

For the present disclosure to be easily understood and readily practiced, the present disclosure will now be described for purposes of illustration and not limitation in connection with the following figures, wherein:

FIG. 1 shows a perspective view of a preferred end post according to the present disclosure; and FIG. 2 shows a top right perspective view of the end post of FIG. 1.

DETAILED DESCRIPTION

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

One embodiment of the presently proposed design preferably incorporates individual ceramic discs (18A, 18B) in the top section (12) and bottom section (16) of end post (30). This way even one individual disc fails completely the failure will be contained in that piece and a complete failure of the part will be avoided. The discs proposed in the design are preferably about 0.38" in diameter (18A) or 0.61" in diameter (18B) and placed about 0.38" away from the outer contour of the rail to prevent their contact with train wheels.

Fiber reinforced polymer (FRP) materials, particularly G10FR4 are also used in end post designs due to its excellent electrical insulation properties structural strength. Transit railroads using traction power systems (overhead catenary or third rail) use mostly this type of product because the electrical demand from the insulated rail joint is greater than the same in a freight railroad. Traction power system designs usually utilize the running track for returning traction power to the substations and this increases demand for insulations at rail joint location. In freight railways, insulation is only needed for signaling.

While FRP is acceptable as an end post material its rigid construction can be its shortcoming. FRP end posts are known to break from their weakest section, in the middle portion between the rail head and base due their inability to stretch enough to sustain intermittent deformation during train wheel passes, especially in freight railroads where wheel loads and impacts are high.

In a preferred design of the present disclosure, the end post construction has advantages from using various dissimilar materials in a composite design. This innovative design encompasses FRP material at the top and the bottom extremities of the end post where the highest electrical resistance and rigidity are needed. The ceramic pieces (18A, 18B) are utilized in the body of the end post (see U.S. Pat. No. 8,070,073 incorporated by reference herein for all purposes) providing compressive strength away from the train wheel contact, hence the impacts. The materials are preferably held together in a polymer matrix, preferably made of polyurethane, a material that is flexible enough to withstand intermittent deformation during train wheel passes.

Molding with polymer is the preferred method of producing the end post. Ceramic pieces (18A, 18B), contacting the FRP, are preferably glued to the FRP prior to molding with the polyurethane. Ceramic pieces (18A, 18B), not contacting FRP, are placed in the mold prior to polyurethane casting.

The multiple-piece construction design enables elimination of various pieces for cost reduction and ease of manufacturing. For example, the ceramic pieces (18A, 18B) may be completely excluded in other embodiments of the present disclosure for cost reduction and ease of manufacturing, leading to an end post made of FRP rail head and base connected by and elastomeric polymer stem, without any ceramic elements (18A, 18B).

FIG. 1 illustrates an end post (30) according to a preferred embodiment of the present disclosure comprising a top portion (12) having a profile substantially identical to cross-sectional shapes of rail head sections of first and second rails of the rail joint assembly; wherein the top portion (12) comprises a top portion inner area (15) and a top portion outer area (13) preferably along a perimeter of the top portion; a base (16) having a profile substantially identical to cross-sectional shapes of rail base sections of first and second rails of the rail joint assembly; wherein the base (16) comprises a base inner area (19) and a base outer area (17) preferably along a perimeter of the base; a stem (14) disposed between the top portion (12) and the base (16); wherein the top portion outer area (13) and the base outer area (17) consist essentially of a first electrically insulating material comprising a fiber reinforced polymer material; wherein the top portion inner area (15), stem (14) and base inner area (19) consist essentially of a second electrically insulating material comprising a polymer material; a plurality of first pieces (18A) of a third electrically insulating material comprising a ceramic material spaced apart and attached to, by adhesive or other means, an inner side of the top portion outer area (13) and to an inner side of the base outer area (17), wherein each of the plurality of first pieces (18A) is also disposed, at least in-part, within the second electrically insulating material in either the top portion inner area (15) or the base inner area (19); and a plurality of second pieces (18B) of the third electrically insulating material, wherein each of the plurality of second pieces (18B) is disposed, in-whole or in-part, within the second electrically insulating material in either the top portion inner area (15) or the base inner area (19).

Preferably parts of top portion (12), middle stem (14) and base (16) may be made from elastomeric or polymeric material such as plastics in general and including elastomers such as polyurethane and/or other suitable materials such as fiber reinforced polymers. If a rigid end post (30) is desired instead of an elastomeric one, G10 fiberglass material is preferably used to construct end post (30) as described herein. Both elastomeric and rigid G10 fiberglass materials are commercially available for use in end posts (30). Additionally, the polymeric or elastomeric material of end post (30) serves as a matrix for the incorporation of different materials in the top portion (12) and in the base (16) to provide compression strength to the end post. Preferably, this different material may comprise cylindrical or disc-shaped pieces (18A), (18B) or other suitably shaped pieces of an electrically insulating material, such as a ceramic material which may comprise zirconium dioxide or zirconia ($ZrO_2$), aluminum oxide or alumina ($Al_2O_3$) or silicon nitride ($Si_3N_4$). Pieces (18A), (18B) may also be made from other electrically insulating materials suitable for providing the requisite compression strength. Additionally, pieces (18A), (18B) may comprise or define other shapes such as hexagonal or an irregular disc-like cylinder shape or sphere or sphere-like shapes. Pieces (18A), (18B) may preferably have a thickness of about 0.220 inches providing for a preferred final thickness of end post (30) of about 0.25 inches when a protective fabric is used between the ends of rail and ceramic pieces (18A), (18B). Pieces (18A), (18B) preferably are about 0.38" in diameter (18A) or 0.61" in diameter (18B) and placed about ⅜" away from the outer contour of end post (30) to prevent their contact with train wheels and accommodate standard rail grinding practices.

The composite construction of top portion (12) and base (16) comprising the ceramic pieces (18) arrayed in the polymeric or elastomeric material is used to overcome potential shortcomings that may be associated with larger sheets or pieces of relatively brittle materials such as ceramics which tend to exhibit an uncontrollable progression of failure where a fracture causing the failure may be arrested in a very short distance making the failure appear in the form of "chipping" of small particles or the same fracture may run across the full section of a part causing an immediate and complete failure. While not shown in the drawings, such composite construction of pieces (18A), (18B) in top portion (12) and base (16) may also be employed in stem (14). The composite construction of end post (30) thus provides redundancy such that even if one or more individual pieces (18A), (18B) fail completely, the failure will be contained in those particular pieces (18A), (18B) and a complete failure of all ceramic pieces (18A), (18B) will be avoided.

In another preferred embodiment of the present disclosure, pieces (18A), (18B) may be covered by layer (not shown) of Kevlar® or other aramid fiber based fabric or equivalent to provide additional strength and protection for pieces (18A), (18B). Such aramid fiber fabrics are highly durable materials and serve to provide a cushion to protect the smooth surfaces of the pieces (18A), (18B) from the rough steel surfaces of the abutting rail ends of the rail joint assembly.

In another embodiment of the present disclosure, an end post (30) for a rail joint assembly comprises a top portion (12) consisting essentially of a first electrically insulating material comprising a fiber reinforced polymer material and having a profile substantially identical to cross-sectional shapes of rail head sections of first and second rails of the rail joint assembly; a base (16) having a profile substantially identical to cross-sectional shapes of rail base sections of first and second rails of the rail joint assembly; and a stem (14) disposed between the top portion (12) and the base (16); wherein the stem (14) and the base (16) consist essentially of a second electrically insulating material comprising a polymer material.

In yet another embodiment of the present disclosure, an end post (30) for a rail joint assembly comprises a top portion (12) consisting essentially of a first electrically insulating material comprising a fiber reinforced polymer material and having a profile substantially identical to cross-sectional shapes of rail head sections of first and second rails of the rail joint assembly; a base (16) consisting essentially of the first electrically insulating material comprising a fiber reinforced polymer material having a profile substantially identical to cross-sectional shapes of rail base sections of first and second rails of the rail joint assembly; and a stem (14) disposed between the top portion (12) and the base (16); wherein the stem (14) consists essentially of a second electrically insulating material comprising a polymer material.

In yet an additional embodiment of the present disclosure, an end post (30) for a rail joint assembly comprises a top portion (12) having a profile substantially identical to cross-sectional shapes of rail head sections of first and second rails of the rail joint assembly; wherein the top portion (12) comprises a top portion inner area (15) and a top portion outer area (13) preferably along a perimeter of the top portion (12); a base (16) having a profile substantially identical to cross-sectional shapes of rail base sections of first and second rails of the rail joint assembly; wherein the base comprises a base inner area (19) and a base outer area (17) preferably along a perimeter of the base (16); and a stem (14) disposed between the top portion (12) and the base (16); wherein the top portion outer area (13) and the base outer area (17) consist essentially of a first electrically insulating material comprising a fiber reinforced polymer material; and wherein the top portion inner area (15), stem (14) and base inner area (19) consist essentially of a second electrically insulating material comprising a polymer material.

The first electrically insulating material preferably comprises one of G10FR4 or other fiberglass-epoxy laminate material made of glass cloth impregnated with an epoxy resin.

In the end post (30) the second electrically insulating material may preferably comprise or consist essentially of polyurethane.

In the end post (30) one or more of the top portion (12), base (16) and stem (14) may preferably comprise a plurality of pieces (18A, 18B) of a third electrically insulating material comprising a ceramic material. Such pieces (18A, 18B) of the third electrically insulating material preferably may be substantially disc-shaped or substantially cylindrical-shaped and may preferably be of different sizes.

In the end post (30) the pieces (18A, 18B) of the third electrically insulating material preferably may be disposed on or in the first electrically insulating material and/or the second electrically insulating material.

In the end post (30) the pieces (18A, 18B) of the third electrically insulating material may preferably comprise or consist essentially of zirconium dioxide, aluminum oxide or silicon nitride.

In the end post (30) the pieces (18A, 18B) of the third electrically insulating material may preferably comprise or consist essentially of pieces of two sizes: a first small size (18A) and a second larger size (18B).

In the end post (30) a plurality of the pieces (18A, 18B) of the third electrically insulating material are spaced apart and attached to, by adhesive or other means, an inner side of the top portion outer area (13) and/or the base outer area (17).

In the end post (30) a plurality of the first small size pieces (18A) of the third electrically insulating material are spaced apart and attached to, by adhesive or other means, an inner side of the top portion outer area (13) and/or an inner side of the base outer area (17).

The end post (30) preferably comprises one or more interference fits (32) wherein each of the interference fits (32) may comprise one or more complementary shapes including geometric shapes. Preferably, the interference fits (32) are used for one or more of the following: to assist in locking together the stem (14) with the top portion (12); to assist in locking together the stem (14) with the base (16); to assist in locking together the top portion inner area (15) with the top portion outer area (13); and to assist in locking together the base inner area (19) with the base outer area (17).

In another aspect, the present disclosure comprises a method for making an end post (30) for a rail joint assembly wherein the end post (30) comprises a top portion (12) and having a profile substantially identical to cross-sectional shapes of rail head sections of first and second rails of the rail joint assembly; wherein the top portion (12) comprises a top portion inner area (15) consisting essentially of a second electrically insulating material comprising a polymer material and a top portion outer area (13) consisting essentially of a first electrically insulating material comprising a fiber reinforced polymer material along a perimeter of the top portion (12); a base (16) having a profile substantially identical to cross-sectional shapes of rail base sections of first and second rails of the rail joint assembly; wherein the base (16) comprises a base inner area (19) consisting essentially of the second electrically insulating material and a base outer area (17) consisting essentially of the first electrically insulating material along a perimeter of the base (16); and a stem (14) consisting essentially of the second electrically insulating material disposed between the top portion (12) and the base (16), comprising: attaching, by adhesive or other means, a plurality of first pieces (18A) of a third electrically insulating material comprising a ceramic material spaced apart and along an inner side of a top portion outer area (13) and spaced apart and along an inner side of a base outer area (17), placing the top portion outer area (13) with attached first pieces (18A) and the base outer area (17) with attached first pieces (18A) spaced apart in a mold, wherein the mold defines one or more cavities for forming the top portion inner area (15), stem (14) and base inner area (19); placing a plurality of second pieces (18B) of the third electrically insulating material in the mold, wherein each of the plurality of second pieces (18B) is disposed, in-whole or in-part, within a mold cavity for forming either the top portion inner area (15) or the base inner area (19); and casting the second electrically insulating material comprising a polymer material within the one or more mold cavities to form the top portion inner area (15), stem (14) and base inner area (19) of the end post (30).

The following description is, therefore, not to be taken in a limited sense, and the scope of the inventive subject matter is defined by the appended claims and their equivalents.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An end post (30) for a rail joint assembly comprising:
   a top portion (12) having a profile substantially identical to cross-sectional shapes of rail head sections of first and second rails of the rail joint assembly; wherein the top portion (12) comprises a top portion inner area (15) distinct from and at least partially surrounded by a top portion outer area (13) disposed along a perimeter of the top portion (12);
   a base (16) having a profile substantially identical to cross-sectional shapes of rail base sections of first and second rails of the rail joint assembly; wherein the base comprises a base inner area (19) distinct from and at least partially surrounded by a base outer area (17) disposed along a perimeter of the base (16); and
   a stem (14) disposed between the top portion (12) and the base (16);
   wherein the top portion outer area (13) and the base outer area (17) consist essentially of a first electrically insulating material comprising a fiber reinforced polymer material; and
   wherein the top portion inner area (15), stem (14) and base inner area (19) consist essentially of a second electrically insulating material comprising a polymer material.

2. The end post (30) of claim 1 wherein the first electrically insulating material comprises one of G10FR4 or other fiberglass-epoxy laminate material made of glass cloth impregnated with an epoxy resin; and
   wherein the second electrically insulating material comprises polyurethane.

3. The end post (30) of claim 1 wherein one or more of the top portion (12), base (16) and stem (14) comprise a plurality of pieces (18A, 18B) of a third electrically insulating material comprising a ceramic material.

4. The end post (30) of claim 3 wherein the pieces (18A, 18B) of the third electrically insulating material are substantially disc-shaped or substantially cylindrical-shaped.

5. The end post (30) of claim 4 wherein the pieces (18A, 18B) of the third electrically insulating material are of equal or different sizes.

6. The end post (30) of claim 3 wherein the pieces (18A, 18B) of the third electrically insulating material are disposed on or in the first electrically insulating material and/or the second electrically insulating material.

7. The end post (30) of claim 3 wherein the pieces (18A, 18B) of the third electrically insulating material comprise or consist essentially of zirconium dioxide, aluminum oxide or silicon nitride.

8. The end post (30) of claim 3 wherein the pieces (18A, 18B) of the third electrically insulating material consist of pieces of two sizes: a first small size (18A) and a second larger size (18B).

9. The end post (30) of claim 8 wherein a plurality of the first small size pieces (18A) of the third electrically insulating material are spaced apart and attached to, by adhesive or other means, an inner side of the top portion outer area (13) and/or an inner side of the base outer area (17).

10. The end post (30) of claim 7 wherein a plurality of the pieces (18A, 18B) of the third electrically insulating, material are spaced apart and attached to, by adhesive or other means, an inner side of the top portion outer area (13) and/or the base outer area (17).

11. The end, post (30) of claim 3 comprising one or more interference fits (32) wherein each of the interference fits (32) may comprise one or more complementary shapes including geometric shapes.

12. The end post (30) of claim 11 wherein the interference fits (32) are used for one or more of the following: to assist in locking together the stem (14) with the top portion (12); to assist in locking together the stem (14) with the base (16); to assist in locking together the top portion inner area (15) with the top portion outer area (13); and to assist in locking together the base inner area (19) with the base outer area (17).

13. An end post (30) for a rail joint assembly comprising:
a top portion (12) having a profile substantially identical to cross-sectional shapes of rail head sections of first and second rails of the rail joint assembly; wherein the top portion (12) comprises a top portion inner area (15) distinct from and at least partially surrounded by a top portion outer area (13) disposed along a perimeter of the top portion;
a base (16) having a profile substantially identical to cross-sectional shapes of rail base sections of first and second rails of the rail joint assembly; wherein the base (16) comprises a base inner area (19) distinct from and at least partially surrounded by a base outer area (17) disposed along a perimeter of the base;
a stem (14) disposed between the top portion (12) and the base (16);
wherein the top portion outer area (13) and the base outer area (17) consist essentially of a first electrically insulating material comprising a fiber reinforced polymer material;
wherein the top portion inner area (15), stem (14) and base inner area (19) consist essentially of a second electrically insulating material comprising a polymer material;
a plurality of first pieces (18A, 18B) of a third electrically insulating material comprising a ceramic material spaced apart and attached to, by adhesive or other means, an inner side of the top portion outer area (13) and to an inner side of the base outer area (17), wherein each of the plurality of first pieces (18A, 18B) is also disposed, in-part, within the second electrically insulating material in either the top portion inner area (15) or the base inner area (19); and
a plurality of second pieces (18B) of the third electrically insulating material, wherein each of the plurality of second pieces (18B) is disposed, in-whole or in-part, within the second electrically insulating material in either the top portion inner area (15) or the base inner area (19).

14. A method for making an end post (30) for a rail joint assembly wherein the end post (30) comprises a top portion (12) and having a profile substantially identical to cross-sectional shapes of rail head sections of first and second rails of the rail joint assembly; wherein the top portion (12) comprises a top portion inner area (15) consisting essentially of a second electrically insulating material comprising a polymer material distinct from and at least partially surrounded by a top portion outer area (13) consisting essentially of a first electrically insulating material comprising a fiber reinforced polymer material disposed along a perimeter of the top portion (12); a base (16) having a profile substantially identical to cross-sectional shapes of rail base sections of first and second rails of the rail joint assembly; wherein the base (16) comprises a base inner area (19) consisting essentially of the second electrically insulating material distinct from and at least partially surrounded by a base outer area (17) consisting essentially of the first electrically insulating material disposed along a perimeter of the base (16); and a stem (14) consisting essentially of the second electrically insulating material disposed between the top portion (12) and the base (16), comprising:
attaching, by adhesive or other means, a plurality of first pieces (18A, 18B) of a third electrically insulating material comprising a ceramic material spaced apart along an inner side of the top portion outer area (13) and spaced apart along an inner side of the base outer area (17),
placing the top portion outer area (13) with attached first pieces (18A) and the base outer area (17) with attached first pieces (18A) spaced apart in a mold, wherein the mold defines one or more cavities for forming the top portion inner area (15), stem (14) and base inner area (19);
placing a plurality of second pieces (18B) of the third electrically insulating material in the mold, wherein each of the plurality of second pieces (18B) is disposed, in-whole or in-part, within a mold cavity for forming either the top portion inner area (15) or the base inner area (19); and
casting the second electrically insulating material comprising a polymer material within the one or more mold cavities to form the top portion inner area (15), stem (14) and base inner area (19) of the end post (30).

* * * * *